(12) United States Patent
Hudgins

(10) Patent No.: US 6,983,510 B1
(45) Date of Patent: Jan. 10, 2006

(54) BELT CLEANING SYSTEMS AND METHODS

(76) Inventor: Herbert Ray Hudgins, 3147 Chestatee Rd., Gainesville, GA (US) 30506

(*) Notice: Subject to any disclaimer, the term of this patent is extended or adjusted under 35 U.S.C. 154(b) by 553 days.

(21) Appl. No.: 10/251,281

(22) Filed: Sep. 20, 2002

Related U.S. Application Data

(60) Provisional application No. 60/324,072, filed on Sep. 21, 2001.

(51) Int. Cl.
*B65G 45/00* (2006.01)
*B65G 45/18* (2006.01)

(52) U.S. Cl. .................... 15/256.5; 198/494; 198/496; 474/92; 15/256.52

(58) Field of Classification Search ............... 15/256.5, 15/256.52; 198/494, 496, 498–499; 474/92
See application file for complete search history.

(56) References Cited

U.S. PATENT DOCUMENTS 5,519,480 A * 5/1996 Thayer et al. ............... 399/355

FOREIGN PATENT DOCUMENTS

GB 2 067 497 * 7/1991

* cited by examiner

*Primary Examiner*—John Kim
*Assistant Examiner*—Laura C Cole
(74) *Attorney, Agent, or Firm*—Greg O'Bradovich, P.C.

(57) ABSTRACT

Systems and methods for cleaning belts used to move fiber optics are disclosed. In general, the system includes wheels that can be arranged to receive a fiber optic belt. The belt can be arranged between a contact plate and a brush. Movement is provided to both the belt and brush and a frictional force is created between the surface of the belt to be cleaned and the brush. This contact and friction cleans the residue from the belt.

7 Claims, 3 Drawing Sheets

Fig_1

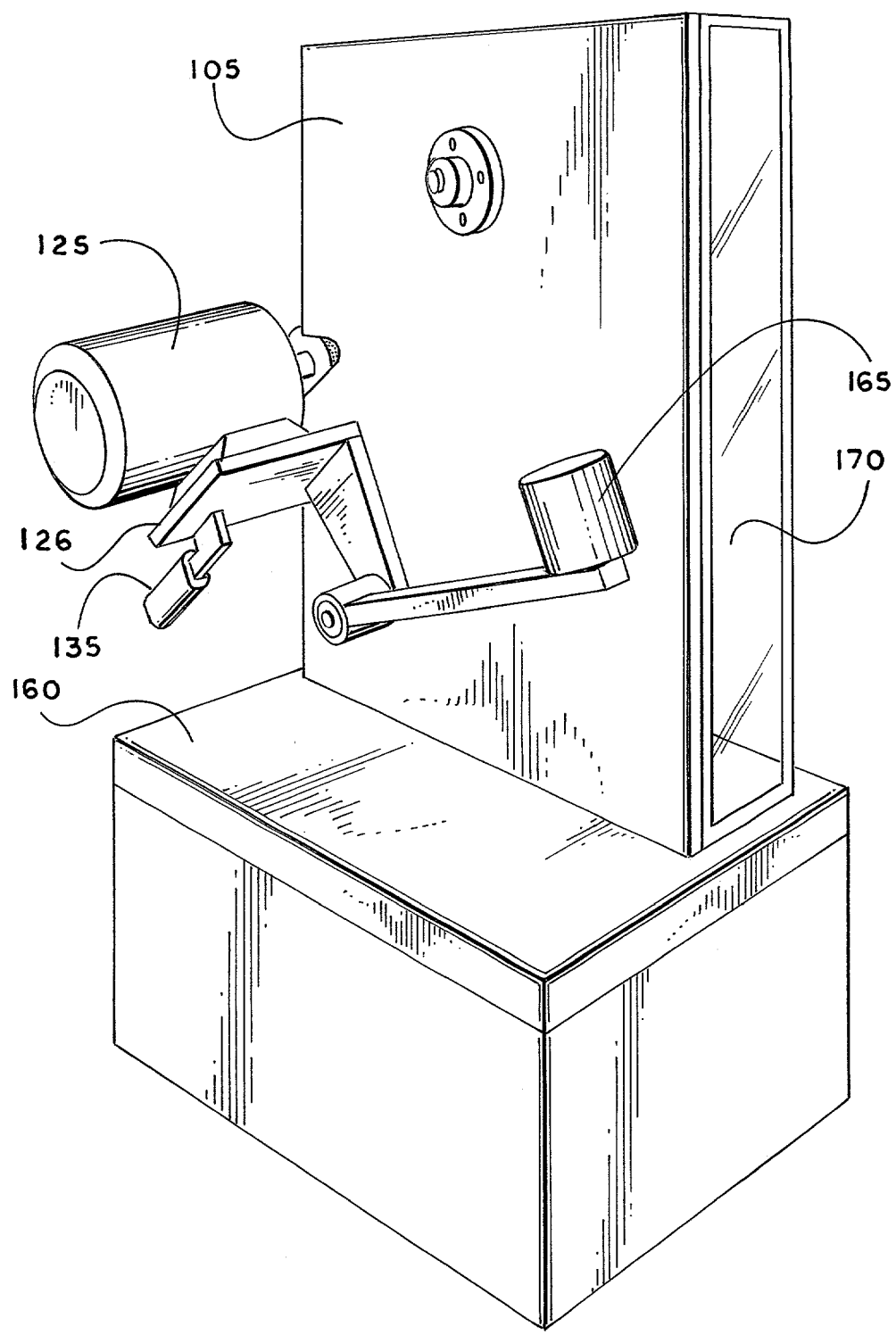
Fig_3

BELT CLEANING SYSTEMS AND METHODS

This application is a utility application which claims the benefit of priority of U.S. Provisional Patent Application No. 60/324,072, filed Sep. 21, 2001, entitled "Belt Cleaning Systems and Methods".

BACKGROUND OF THE INVENTION

I. Field of the Invention.

The present invention relates generally to the field of belts used to wind, rewind and move fiber optics, and in particular to a system and method of cleaning fiber optic belts.

II. Description of the Related Art.

Belts are commonly used to wind, rewind and otherwise move fiber optics such as fiber optic wire. This belts are used to guide the wire onto spools, for example. The belts typically include a surface that is highly durable and provides a frictional surface for the fiber optics. After short use, the surface often becomes coated with residue from the exterior of the fiber optics, typically residue from the outer cladding. This build up of residue can often damage subsequent fiber optics wound over the belt or otherwise misguide the wire on the belt. Although the belts are highly durable, the belts are typically removed and discarded from the wind/rewind machines.

SUMMARY OF THE INVENTION

In general, the invention features a system and method for cleaning the belts used to move fiber optics. Systems and methods for cleaning belts used to move fiber optics are disclosed. In general, the system includes wheels that can be arranged to receive a fiber optic belt. The belt can be arranged between a contact plate and a brush. Movement is provided to both the belt and brush and a frictional force is created between the surface of the belt to be cleaned and the brush. This contact and friction cleans the residue from the belt.

In general, in one aspect, the invention features a belt cleaning system, including a first wheel arranged in a mount in a plane of rotation, a second wheel arranged in the mount in the plane of rotation, the wheels defining a path of movement, a circular brush connected to the mount, the brush being generally located in the plane of rotation and so that a portion of a perimeter of the brush is in the path of movement and a contact plate connected to the mount in opposition to the perimeter of the circular brush.

In one implementation, the path of movement is adapted to receive a fiber optic belt.

In another implementation, the system further includes an additional wheel connected to the mount in the plane of motion, the additional wheel defining at least one additional path of movement adapted to receive a fiber optic cleaning belt.

In another implementation, the system further includes a motor connected to the mount.

In another implementation, the motor is connected to the brush and to the mount.

In another implementation, the system further includes a lever connected to the motor.

In another implementation, the lever is connected to a motor mount, the motor is connected to the motor mount and the motor mount is connected to the mount.

In another implementation, a portion of the fiber optic belt is located between the contact plate and the outer perimeter of the brush.

In another implementation, the system includes one or more swivel arms connected to the wheels and to the mount.

In another implementation, the system further includes a counter weight connected to an arm connected to the motor.

In another aspect, the invention features a method of cleaning fiber optic belts, including arranging a fiber optic belt on a fiber optic cleaning system having a brush, putting the brush into contact with a surface of the belt that is to be cleaned, moving the belt with respect to the brush so that a frictional force is created between the surface to be cleaned and the brush and continuing the contact and motion until desired cleaned is attained.

In one implementation, the belt is driven between the brush and a contact plate connected to the machine.

In another implementation, the method includes removing the belt when the belt has been cleaned as desired.

In another implementation, the method further includes optionally cleaning the belt with a suitable solvent.

In still another aspect, the invention features a belt cleaning machine, including a mount, at least two wheels connected to a mount, the wheels being adapted to receive a belt having fiber optic residue on the surface of the belt, wherein a path is defined in a plane of rotation, a brush connected to the mount and adapted to come into contact with the surface of the fiber optic belt, the brush being adapted to remove the residue from the belt, a contact plate connected to the mount and oriented in opposition to the brush so that the brush and contact plate can be moved toward each other to pinch the fiber optic belt between the brush and the contact plate, a motor connected to the mount and to a shaft connected to the brush and a lever to engage the brush and the contact plate.

In one implementation, the lever is connected to the motor.

One advantage of the invention is that it allows the reuse of the belts without having to discard the belts.

Another advantage is that it allows a single belt to be used for several orders of magnitude more times than if the belt were discarded.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 3 illustrates a view of an embodiment of a motor having a counterweight for an embodiment of a belt cleaning machine.

DETAILED DESCRIPTION

Cleaning Systems

Figure 1:
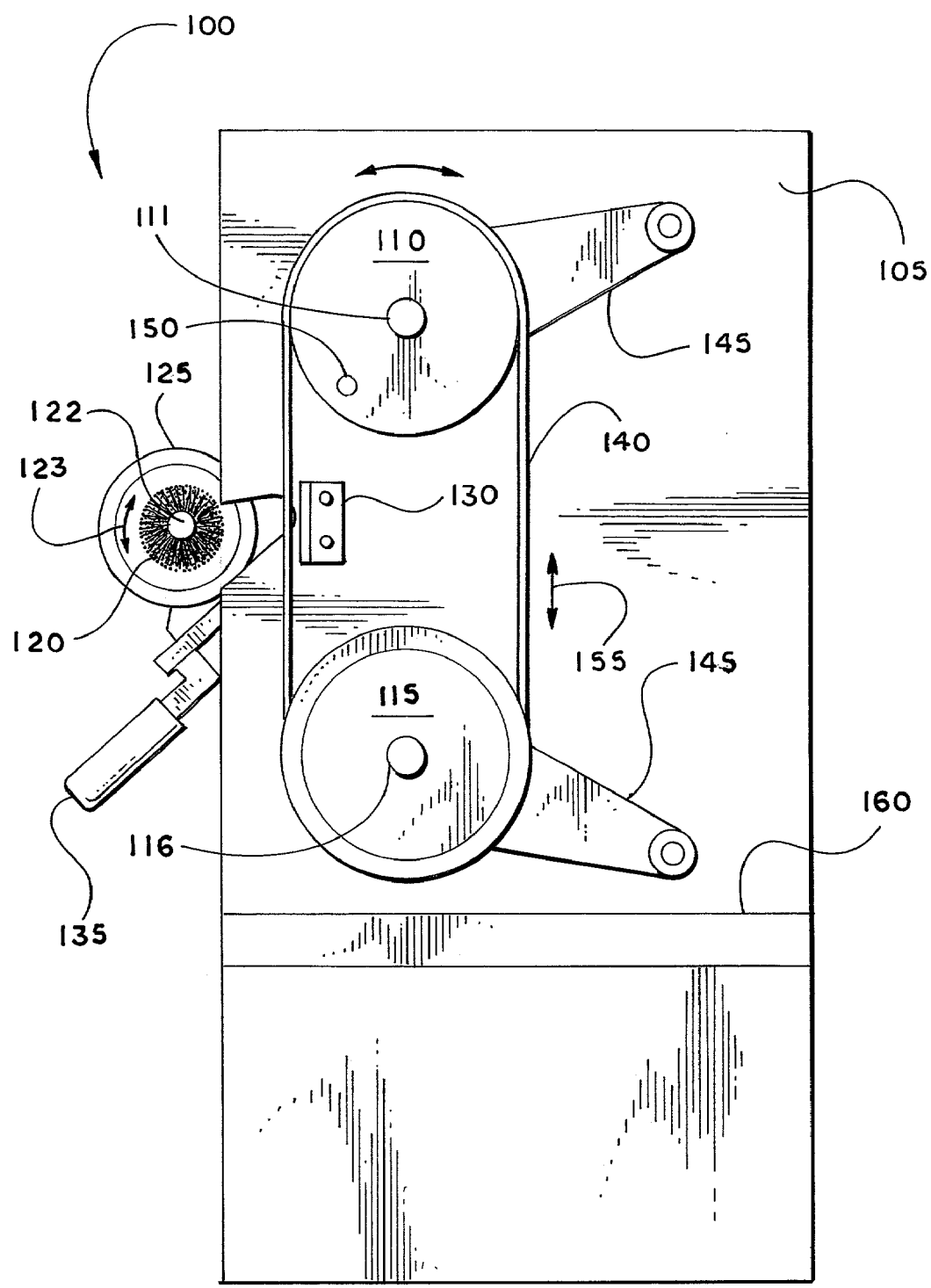
FIG. 1 illustrates an embodiment of a fiber optic belt cleaning machine.

Referring to the drawings wherein like reference numerals designate corresponding parts throughout the several figures, reference is made first to FIG. 1 that illustrates an embodiment of a fiber optic belt cleaning machine 100.

The machine 100 includes a mount 105. Two wheels 110, 115 are connected to the mount 105 in a planar arrangement, so that a belt 140 can be placed onto the wheels 110, 115 for cleaning. The wheels 110, 115 are generally defined in a common plane of rotation. The wheels rotate about shafts 111, 116 respectively. The mount 105 is typically used to provide a surface to connect the wheels 110, 115. The mount 105 can be connected to a larger apparatus for ease of management of the belt cleaning machine 100. Such an apparatus can be a dolly to move the belt cleaning machine 100 around locations as needed. The machine 100 further includes circular brush 120 connected to a motor 125. The bristles of the brush are typically a very hard material so that they can withstand repeated use and clean fiber optic residue from the belts. Typically the bristles are metallic or some other hard material. The motor typically drives a shaft 122 that is coupled to the motor 125 and connected to the brush. The motor 125 is used to provide power to the circular brush 120 by providing a rotational force to the shaft 122. The motor can be multi directional and have a variable speed to rotate the brush 120 in either direction as indicated by arrow 123. The motor 125 can also be coupled to one or both of the shafts 111, 116 of the wheels 110, 115 to provide drive power to the wheels 110, 115. In another embodiment, the wheels 110, 115 are not coupled to the motor 125. Instead, a manual lever 150 is connected to one of the wheels 110, 115 and can be manually rotated. One or both of the wheels can be connected to a swivel arm 145 that can move the wheels 110, 115 in order to tighten a belt 140 onto the wheels 110, 115 to provide a suitable tension for movement about the wheels 110, 115 and cleaning. The swivel arms 145 can be pivoted in a variety of ways. The can be connected to a lever and lock. The lever can be engaged to move the wheels 110, 115 into a desired location and then be locked. In another embodiment, the swivel arms 145 can be spring loaded with a bias in the direction away from each other so that a belt is automatically tightened when it is placed on the wheels 110, 115 and the swivel arms 145 are released. It is understood that other embodiments contemplate other ways for the swivel arms 145 to pivot and move.

The machine 100 further includes an contact plate 130 connected to the mount 105. The contact plate 130 is typically connected to a lever 135. The contact plate 130 is typically a flat planar body made from a hard material. The contact plate 130 is typically in an opposed orientation compared to the brush 120 so that the belt 140 can be sufficiently pressed between the contact plate 130 and the brush 120. The lever 135 can be manually engaged to move the contact plate 130 toward the brush 120. In another embodiment, the lever 135 can be connected to the brush 120, motor 125 or a motor mount (described below) to move the brush 120 toward the contact plate 130. Since the brush 120 is typically connected to the motor 125, the motor 125 can be connected to a counter weight (described below) to provide more even balance when the brush 120 is moved. In another embodiment, the lever 135 can be coupled to a switch that controls the power of the motor. Therefore, when the lever is engaged, the switch is engaged providing power to the motor.

The belt 140, which is to be cleaned, is wrapped around the wheels 110, 115, using the swivel arms 145 as necessary to allow sufficient slack in the belt 140 so that it can be wrapped, or threaded about the wheels 110, 115. Typically the belt 140 cannot be easily stretched. Therefore, one or both of the wheels 110, 115 can be shifted to allow the belt to be wrapped around the wheels 110, 115, such as by using the swivel arms 145.

In an alternate embodiment, the machine 100 can further include a cover 170 that covers the wheels 110, 115, the brush 120, the contact plate 130 and the other pertinent components of the machine 100. The cover 170 generally keeps debris from flying away as it is removed from the belt 140 so as to keep the debris contained.

Figure 2:
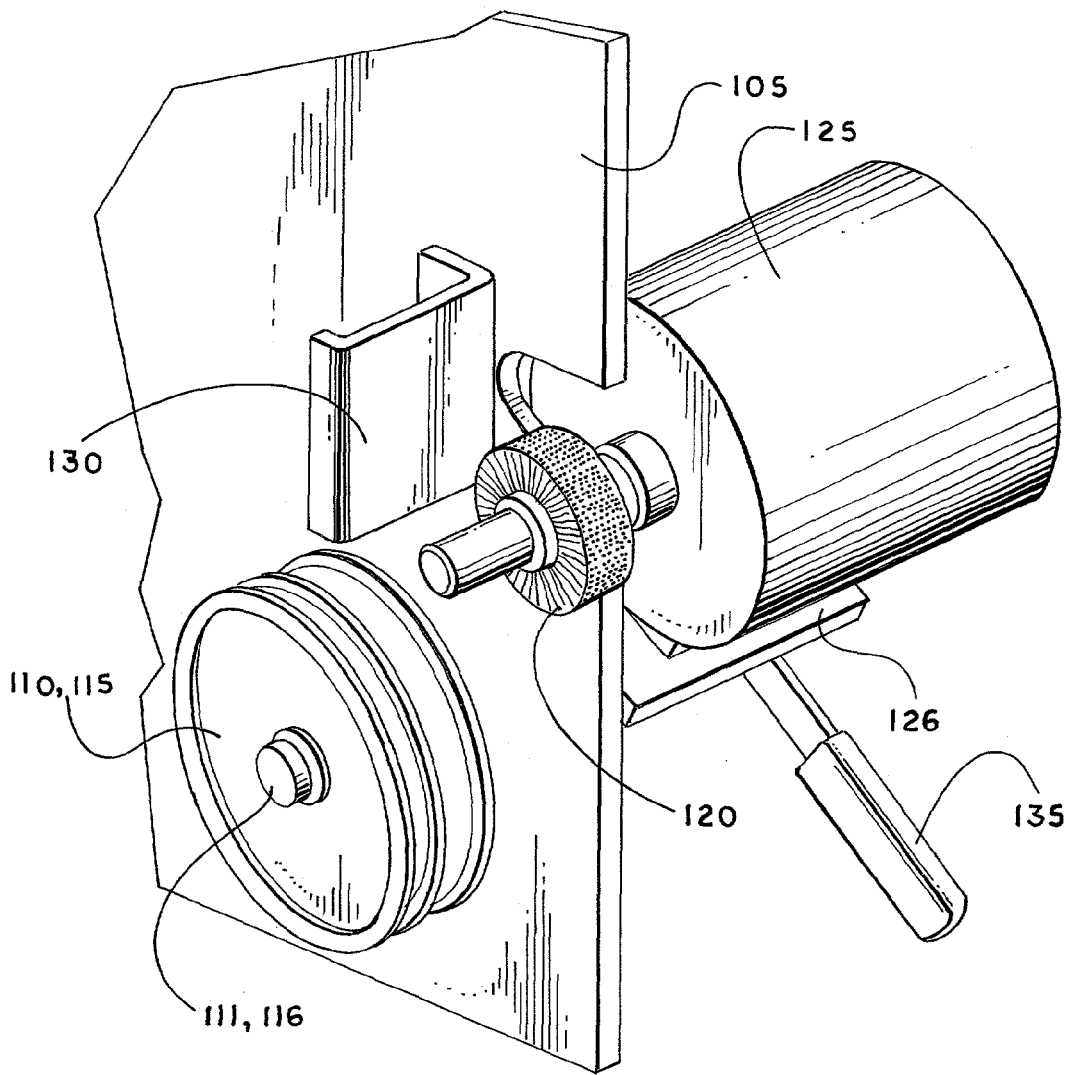
FIG. 2 illustrates a close up view of an embodiment of a brush and a motor for an embodiment of a belt cleaning machine.

FIG. 2 illustrates a close up view of an embodiment of a brush 120 and a motor 125 for an embodiment of a belt cleaning machine 100. As described above the brush 120 is connected to the motor 125 by a shaft 122. FIG. 2 further illustrates one of the wheels 110, 115 connected to the mount by its shaft 111, 116. FIG. 2 further illustrates that the motor 125 is mounted on a motor mount 126. The lever 135 is connected to the motor mount 126.

FIG. 3 illustrates a view of an embodiment of a motor 125 having a counter-weight 165 for an embodiment of a belt cleaning machine 100. The counter weight 165 is generally connected to an arm 160 so as to provide a greater torque on the motor 125 to provide ease of engagement and disengagement of the brush 120 to the belt 140.

Systems Operation and Cleaning Methods

The operation of the machine 100 is now discussed. The lever 135 can be engaged to distance the brush 120 from the path of the belt 140 that is to be cleaned. The path of the belt is typically located around the outer circumferences of the wheels 110, 115 through the space between the opposing brush 120 and contact plate 130. As described above, one or both of the wheels 110, 115 can be shifted from its position so that the belt 140 can be wrapped around the wheels 110, 115, typically by pivoting the swivel arms 145. Once the belt 140 is secured around the wheels 110, 115, the wheels 110, 15 can be shifted back in order to put a tension on the belt. Drive power is provided to the shaft 122 and the circular brush 120 by the motor 125 or by other mechanisms. Drive power is typically also provided to the wheels 110, 115 to provide a linear motion, tangential to the belt 140, as indicated by arrows 155 with respect to the brush 120. It is contemplated in other embodiments that the path of the belt 140 can be different. For example, in one embodiment the wheels 110, 115 can have two different diameters so that the path of the belt 140 is generally angled. Therefore, the contact plate 130 and brush 120 have to be angled appropriately to compensate for the change in the angle of the belt 140 path. The user can then engage the lever 135 to move the contact plate 130 toward the surface of the belt 140, that is the side of the belt 140 that is not to be cleaned. When the contact plate 130 contacts the belt 140, the belt that is moving linearly with respect to the brush 120 is pushed toward the now rotating brush 120. In another implementation, the lever 135 can be coupled to the brush and the contact plate 130 remains fixed, so that when the lever 135 is engaged, the brush moves toward the belt that is subsequently rested against the contact plate 130.

In either implementation, as the brush 120 contacts the surface of the belt 140 there is a frictional force created that chips away at the residue that has built up on the belt 140. Typically the residue is in a singular thin path around the entire belt 140. Therefore, the brush can be kept in one position during the cleaning process. The belt lining that comes into contact with the fiber optic material is typically very durable. Therefore, as the brush cleans the residue, the belt lining is typically not damaged from the rotating brush 120. As a result, once the belt 140 is cleaned it can be used and cleaned repeatedly for an indefinite period. It has been determined that the repeated use and cleaning of the belt does not create any damage or irregularities on the belt 140 that can damage the fiber optics that are subsequently put into contact with the belt 140.

In another implementation, no drive power is provided to the wheels 110, 115. Instead, as the belt is engaged between the rotating brush 120 and the contact plate 130, the user can manually turn the wheels 110, 115 with the manual lever 150. In this way, the user can move the belt as the user sees fit to clean the fiber optic material from the belt.

The embodiments described above have disclosed two wheels. It is understood that additional wheels can be added so that the belt can move across the outer circumferences of the additional wheels.

Once the belts have been cleaned using the cleaning machine 100, additional methods can be used to remove any additional residue. For example, suitable solvents can be wiped on the belts in order to remove any additional residue.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A belt cleaning system, comprising:
    a first wheel arranged in a mount in a plane of rotation;
    a second wheel arranged in the mount in the plane of rotation, the wheels defining a path of movement;
    a circular brush connected to the mount, the brush being generally located in the plane of rotation and so that a portion of a perimeter of the brush is in the path of movement;
    a contact plate connected to the mount in opposition to the perimeter of the circular brush
    a motor connected to the brush and to the mount; and
    a lever connected to the motor.

2. The system as claimed in claim 1 further comprising an additional wheel connected to the mount in the plane of motion, the additional wheel defining at least one additional path of movement adapted to receive a fiber optic cleaning belt.

3. The system as claimed in claim 1 wherein the lever is connected to a motor mount, the motor is connected to the motor mount and the motor mount is connected to the mount.

4. The system as claimed in claim 1 further comprising a counter weight connected to an arm connected to the motor.

5. A belt cleaning system, comprising:
    a first wheel arranged in a mount in a plane of rotation;
    a second wheel arranged in the mount in the plane of rotation, the wheels defining a path of movement;
    a circular brush connected to the mount the brush being generally located in the plane of rotation and so that a portion of a perimeter of the brush is in the path of movement;
    a contact plate connected to the mount in opposition to the perimeter of the circular brush; and
    one or more swivel arms connected to the wheels and to the mount.

6. A belt cleaning machine, comprising:
    a mount;
    at least two wheels connected to a mount, the wheels being adapted to receive a belt having fiber optic residue on the surface of the belt, wherein a path is defined in a plane of rotation;
    a brush connected to the mount and adapted to come into contact with the surface of the fiber optic belt, the brush being adapted to remove the residue from the belt;
    a contact plate connected to the mount and oriented in opposition to the brush so that the brush and contact plate can be moved toward each other to pinch the fiber optic belt between the brush and the contact plate;
    a motor connected to the mount and to a shaft connected to the brush; and
    a lever to engage the brush and the contact plate.

7. The machine as claimed in claim 6 wherein the lever is connected to the motor.

* * * * *